United States Patent [19]

Smith

[11] 3,772,517
[45] Nov. 13, 1973

[54] DETAILED PHOTOMETER
[76] Inventor: David A. Smith, Rt. 1, Box 19B, Willcox, Ark. 85643
[22] Filed: May 8, 1972
[21] Appl. No.: 251,031

[52] U.S. Cl. ............ 250/209, 95/10 CE, 250/214 P, 356/226
[51] Int. Cl. ........ G01j 1/00, G01j 1/44, H01j 39/12
[58] Field of Search .................. 250/209, 214 P; 95/10 CE, 10 CT; 356/226

[56] References Cited
UNITED STATES PATENTS
3,545,350  12/1970  Gross ............................. 250/209 X
3,563,143   2/1971  Petersen ......................... 250/209 X Primary Examiner—Archie R. Borchelt
Assistant Examiner—T. N. Grigsby
Attorney—C. Robert Von Hellens et al.

[57] ABSTRACT

A device is disclosed for determining the minimum, maximum and average luminescent density of an object under inspection. An array of light sensitive sensors are directed toward the object under inspection in an optical image plane and leak current in proportion to the light radiated from the object. An impedance in series with each of the sensors develops a voltage. One terminal of each of two sets of gating diodes of opposite polarity are connected to the impedance-sensor node. The other terminal of each of the diodes of one polarity is connected to a first common terminal and the other terminals of each of the diodes of another polarity is connected to a second terminal. The voltage at the first and second common terminals is operated upon to provide output signals indicative of the maximum and minimum luminescent density of the object under inspection. The impedance in series with the sensors is connected to a third common terminal. The voltage present at the third common terminal is operated upon to provide an output signal indicative of the average luminescent density of the object under inspection.

11 Claims, 1 Drawing Figure 3,772,517
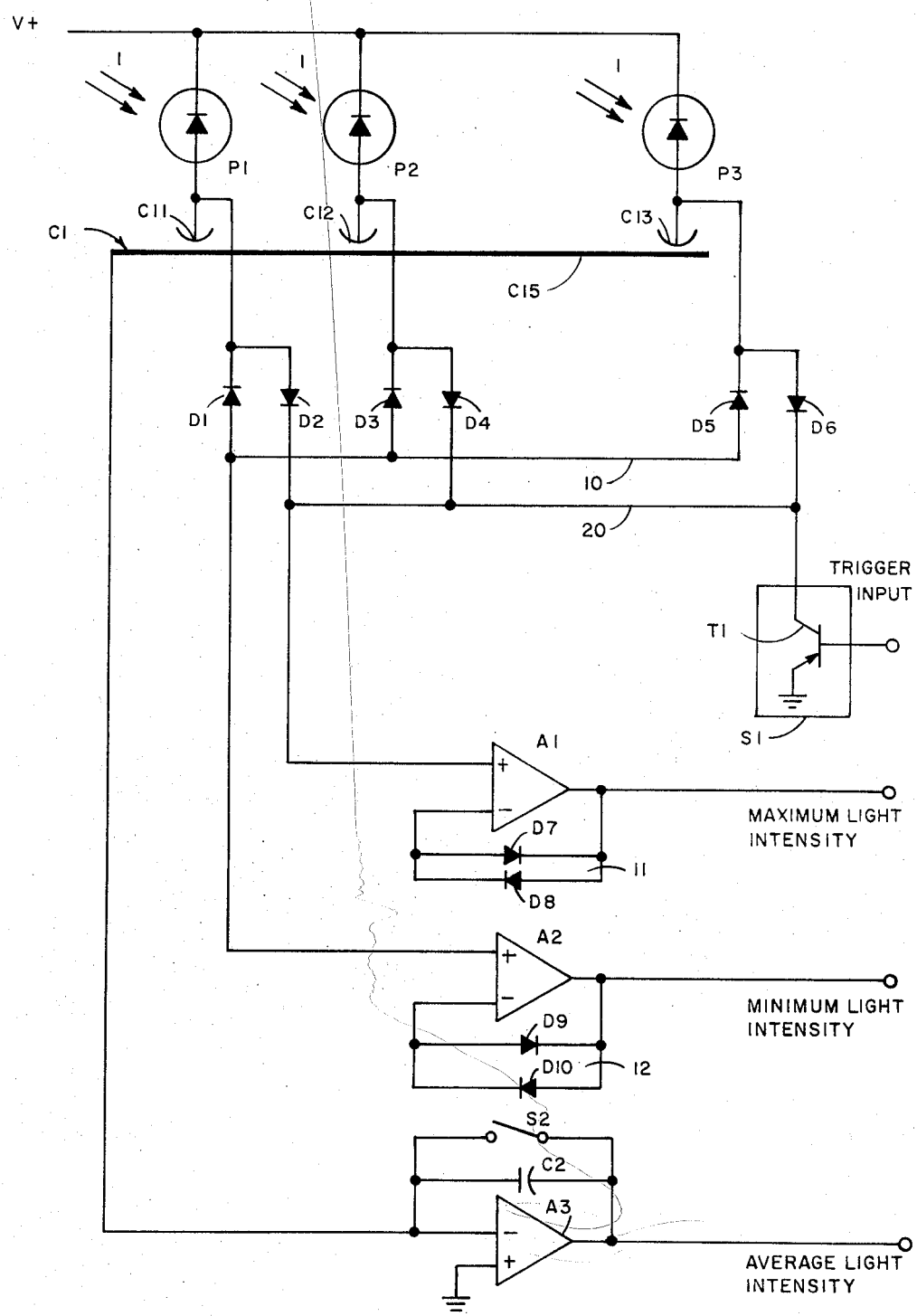

DETAILED PHOTOMETER

The present invention relates to light detecting circuitry, and, more particularly, to light detecting circuitry providing an output representative of the minimum, maximum and average detected light.

Light detection circuitry generally operates in conjunction with a detector which is sensitive to the amount of light directed toward the detector. The detector provides an electrical output signal proportional to the light impinging upon the detector. The circuitry associated with the detector operates upon the output signal by any one of several processes. In some circuits, there is a simple on-off switching function responsive to a specified threshold signal developed by the detector. The threshold may be either high or low. In other circuits, an analog signal is derived responsive to the amount of light impinging upon the detector. In yet others, a plurality of detectors are used with summing circuitry to provide a signal indicative of the average amount of light impinging upon the detectors. The latter group of circuits include a circuit described in a U.S. Pat. issued on Mar. 21, 1967, to R. C. Babish, No. 3,310,679.

The circuit taught by Babish includes a plurality of diodes each having one terminal connected in series with one of a plurality of photovoltaic cell light sensitive detectors. The other terminals of the diodes are commonly connected to a voltage source. An amplifier is connected to the common terminal and provides a signal to utilization apparatus, such as a camera. Switch means are provided for simultaneously reversing the diode terminal connections and the polarity of the voltage source. In one position of the switch means, the minimum detected light will be indicated at the output of the amplifier while the maximum detected light will be indicated in another position of the switch means.

It is well known that the response of photovoltaic cells to light intensity is a non-linear function. Where a linear resistor system, such as disclosed in Babish, is used in conjunction with non-linear light detectors to obtain an output reflective of the light intensity, the useful range of accurate light detection is necessarily limited. This result arises from the mating of a non-linear input signal with a linear system operating upon the input signal. In some applications, such as monitoring circuits used in television or motion picture cameras, the limitations of Babish are not readily apparent as the field of view is of a generally relatively limited light intensity range. However, where the light intensity of the subject matter to be monitored varies substantially, such as found in X-rays or the like, the system of Babish will not perform as an accurate monitor.

It is therefore a primary object of the present invention to provide a light sensitive detector for monitoring a wide light intensity range.

Another object of my invention is to provide simultaneous multiple output signals from a light monitoring circuit, each output signal being indicative of a different light intensity parameter.

Yet another object of my invention is to provide scanning apparatus for determining the light transmission quality of an element under test.

A further object of my invention is to provide a multiple input light detection circuit.

A still further object of my invention is to provide simultaneous multiple function outputs from a light detection circuit.

These and other objects of the present invention will become more apparent as the description thereof proceeds.

The present invention may be understood with more specificity and clarity with reference to the sole figure illustrating the light detection circuit of the present invention.

In the following discussion of the invention illustrated in the drawing, the terms diodes and transistors will be used to describe an active element drawn as a diode or transistor. It is to be understood, however, that the term "active element" might just as easily have been used and thereby embrace other devices presently known or unknown which may perform the same function.

Referring to FIG. 1, a preferred embodiment of the present invention is shown for obtaining an indication of the minimum, maximum and average transmission or reflection of light from an object under test. The light is represented by the arrows identified by numeral 1. A plurality of photo diodes, three of which are shown, P1, P2, and P3, are positioned to receive the reflected light. The physical spacing between adjacent photo diodes and their number is dependent upon the fineness with which the object under test is to be scanned.

A voltage source V+, connected to the cathode electrodes of each of the photo diodes P1, P2, and P3, develops a voltage potential across the photo diodes. The conductance of the photo diodes P1, P2, and P3 is linearly proportional to the light intensity detected by the photo diodes. Hence, the leakage current through the photo diodes P1, P2, and P3 is linearly proportional to the detected light intensity.

The anode electrode of each of the photo diodes P1, P2 and P3 is connected to the cathode electrode of each diode of a first set of diodes D1, D3, and D5. The first set of diodes is polarized in a first sense. The anode electrode of each of diodes D1, D3 and D5 is connected to a common bus 10. The anode electrode of each of the photo diodes P1, P2 and P3 is also connected to the anode electrode of each diode of a second set of diodes D2, D4, and D6. The second set of diodes is polarized in a second sense. The cathode electrode of each of diodes D2, D4 and D6 is connected to a common bus 20. Each of the anode electrodes of photo diodes P1, P2, and P3 is also connected to one plate C11, C12, and C13, respectively, of a multiplate capacitor C1. Capacitor C1 includes a plate C15 common to each of the plates C11, C12, and C13.

A reset switch S1, is connected to bus 20 and periodically grounds the bus. The reset switch S1 includes a PNP transistor T1. The emitter electrode of the transistor T1 is connected to ground while the collector electrode of transistor T1 is connected to bus 20. The gate electrode of transistor T1 is connected to a signal source, which signal source generates a signal causing transistor T1 to switch its state of conduction in response thereto.

In order to best discuss the significant operational characteristics of the above described circuitry the following assumption will be made. It will be assumed that a different value of light intensity is reflected onto each of the photo diodes P1, P2, and P3. Previously it was mentioned that the photo diodes P1, P2, and P3 conduct in proportion to the intensity of the light impinging thereon. Thus, the photo diode being subjected to the greatest light intensity will have the greatest current flowing therethrough. Conversely, the photo diodes receiving the lowest light intensity will have the lowest leakage current flowing therethrough. The voltage potential developed at the anode electrode of the photo diodes by the respective plates of capacitor C1 is a function of the leakage current and the charge time. Thus, the photo diode detecting the greatest light intensity will have the highest voltage potential developed at its anode electrode. It is assumed that the capacitance for all capacitor plates C11, C12, and C13 is equal.

The three diodes D2, D4 and D6 and bus 20 are effectively connected as an OR circuit. The voltage on any of the anode electrodes of the diodes is at a greater positive potential then the voltage potential on bus 20. When the photo diodes P1, P2, and P3 detect an equal amount of light, the voltage input to the diodes D2, D4 and D6 will be the same and all the diodes will conduct. However, under the above assumption, the photo diodes P1, P2 and P3 do not detect an equal amount of light and the voltage developed by capacitor C1 at the anode electrode of the diodes D2, D4, and D6 will be different. Under these circumstances, only the diode which has the largest voltage input will conduct. The conducting diode provides a voltage on bus 20, which voltage reverse biases the remaining diodes and maintains them in a non-conducting state. Should the distribution of light intensity on the photo diodes P1, P2, and P3 vary, the diode associated with the photo diode subjected to the greatest light intensity will then conduct and establish the voltage potential on bus 20. Thus, for all light intensity input conditions, bus 20 will be reflective of the maximum light intensity detected by photo diodes P1, P2 and P3, or, the brightest spot under test.

Similarly, the three diodes D1, D3 and D5 and bus 10 are effectively connected as another OR circuit. The voltage on any of the cathode electrodes of the diodes is at a greater positive voltage potential then the voltage potential on bus 10. Thus, the diodes D1, D2 and D3 are reverse biased. In any configuration such as this, there will be some leakage current, the amount of which is inversely proportional to the degree of reverse bias. Under the above assumption, the voltage potential on the cathode of one of the diodes D1, D3 and D5 will be less positive, or more negative, than on any of the other diodes. This diode is then the least reverse biased diode and will have the largest leakage current, or develop the largest positive voltage potential on bus 10. The voltage potential developed on bus 10 will increase the reverse bias of the remaining diodes and effectively reduce the conduction of leakage current therethrough. Thus, for all light intensity detected by photo diodes P1, P2 and P3, or the dimmest spot under test.

The impedance developing the voltage potential of the photo diodes P1, P2, and P3 is a multiple capacitor. A capacitor is used for several reasons. First, the impedance of the element should be of the same order of magnitude as the effective impedance of the photo diode which will vary many orders of magnitude in operation. A capacitor's impedance is dependent on exposure time and hence may be made to match the desired impedance using a method to be described later. A resistor is a fixed impedance device and inductors create packaging problems. Second, capacitors can be made with good uniformity. Third, a capacitor yields the highest possible impedance per unit volume.

For the extremes of light intensity, most known light detectors present, at best, poor indications of the relative light intensity as the known detectors are intended to operate over a limited and predetermined range. It is well known that the charge time and hence voltage build-up across a capacitor is a function of the applied current per time period. In the present invention, the applied current is determined by the photo diodes in response to the detected light and cannot be readily modified without extensive additional circuitry. However, the charging time can be modified and thereby the voltage build-up can be modified.

The modifications of the charge time for capacitor C1 is accomplished by reset switch S1. Switch S1 periodically grounds the capacitor C1 to produce a sawtooth wave voltage. The amplitude of the sawtooth wave is proportional to the light intensity. By varying the switching rate of switch S1, it becomes possible to permit the charge time to be increased for low light intensities and decreased for high light intensities. Thus, the response capability of the present invention can be varied over many orders of magnitude.

The triggering mechanisms for switch S1 can be manual or it can be automated. If automated, the triggering mechanism can be a Schmitt trigger controlled by the output reflective of the minimum or maximum input light.

Bus 20 is connected to an amplifier, such as an operational amplifier A–1. Similarly, bus 10 is connected to another amplifier, such as an operational amplifier A–2. The use of operational amplifiers is preferred over other amplifiers due to their high input impedance and characteristic of not loading down the input circuitry. In the OR circuits (D1, D3, D5, and D2, D4, D6) there will exist a "dark current" irrespective of any output from the photo diodes P1, P2 and P3. The "dark current" will charge capacitor C1 and develop an error voltage drift on buses 10 and 20. Unless compensation is provided to nullify the effect of the error voltage, the minimum and maximum light intensity outputs will not be wholly accurate. Each of the operational amplifiers A1 and A2 can be biased by a feedback circuit. Where drift is a serious problem affecting the accuracy of the output signals, bias-current compensation can be introduced to reduce the drift. An article entitled "Linear IC's part 6 Compensating for Drift," appearing in the Feb. 5, 1968, issue of the *Electronics* magazine, describes and illustrates several compensatory circuits. The circuit shown on page 91, including a germanium diode and a selected resistor, is particularly useful in biasing operational amplifiers A–1 and A–2. The circuit, also shown on page 91, including a PNP transistor and a selected resistor is particularly useful in biasing the integrating operational amplifier A–3.

The feedback circuit can be configured as a set of parallel opposite polarity diodes 11 and 12 connected between the output and negative input of operational amplifiers A–1 and A–2, respectively. The output signal from each operational amplifier then becomes referenced to zero by compensating for the voltage drop through diodes D1, D2, D3, D4, D5 or D6 with a voltage drop through diodes D8 and D10. Diodes D7 and D9 are required for stability of the operational amplifiers A–1 and A–2. Diodes D7 and D9 may be replaced with megohm resistors.

The current passing through the common plate C15 of multiplate capacitor C1 is the sum of the currents developed by the individual pates C11, C12, and C13. Plate C15 is connected to an operational amplifier A-3. Amplifier A-3 operates as a resettable integrator due to the feedback through capacitor C2 and switch S2. The output voltage of amplifier A-3 represents the value of the average light intensity detected by photo diodes P1, P2 and P3.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A light detection circuit for scanning a variable light transmitting element and determining the minimum, maximum and average luminescent density of the transmitted light, said circuit comprising:
   a. a plurality of light detectors, each said detection conducting current in proportion to the density of the detected light;
   b. means for developing a voltage in response to the amount of current conducted by each said detector;
   c. a first OR gate, responsive to the voltage developed by said means, said OR gate being polarized in a first sense and providing a first signal source;
   d. a second OR gate responsive to the voltage developed by said means, said OR gate being polarized in a second sense and providing a second signal source;
   e. a first amplifier responsive to said first signal source and providing an output signal reflective of the maximum light density detected by said plurality of light detectors;
   f. a second amplifier responsive to said second signal source and providing an output signal reflective of the minimum light density detected by said plurality of light detectors; and
   g. a third amplifier connected to said means and providing an output signal reflective of the average light density detected by said plurality of light detectors.

2. The circuit as set forth in claim 1 wherein said means comprises a multiplate capacitor.

3. The circuit as set forth in claim 2 including means for periodically grounding at least one plate of said capacitor.

4. The circuit as set forth in claim 1 wherein said plurality of light detectors comprise a plurality of photo diodes.

5. The circuit as set forth in claim 4 wherein said means comprises a multiplate capacitor, said capacitor having a common plate and plurality of individual plates, each of said photo diodes being connected to one of said individual plates.

6. The circuit as set forth in claim 5 wherein said first OR gate comprises a plurality of diodes, one electrode of each one of said diodes being connected to one of said individual plates, and wherein said second OR gate comprises a plurality of diodes, one electrode of each one of said diodes being connected to one of said individual plates.

7. The circuits as set forth in claim 6 including a first bus, said first bus being connected to another electrode of each of said diodes of said first OR gate, and a second bus, said second bus being connected to another electrode of each of said diodes of said second OR gate.

8. The circuit as set forth in claim 7 wherein:
   a. said first amplifier comprises a first operational amplifier connected to said first bus,
   b. said second amplifier comprises a second operational amplifier connected to said second bus, and
   c. said third amplifier comprises a third operational amplifier connected to said common plate of said capacitor.

9. The circuit as set forth in claim 8 wherein said third operational amplifier comprises an integrating operational amplifier.

10. The circuit as set forth in claim 9 including means for compensating for the "dark current" flowing through said photo diodes to reduce the error signal received by said first, second and third operational amplifiers.

11. The circuit as set forth in claim 9 including means for compensating for the voltage drop occurring in said first and second OR gates.

* * * * *

UNITED STATES PATENT OFFICE
CERTIFICATE OF CORRECTION

Patent No. 3,772,517　　　　　　　　Dated November 13, 1973

Inventor(s) DAVID A. SMITH

It is certified that error appears in the above-identified patent and that said Letters Patent are hereby corrected as shown below:

On the cover sheet [76] Inventor, "Willcox, Ark. 85643" should read --- Willcox, Ariz. 85643 -- .

Signed and sealed this 6th day of August 1974.

(SEAL)
Attest:

McCOY M. GIBSON, JR.　　　　　　　C. MARSHALL DANN
Attesting Officer　　　　　　　　　Commissioner of Patents